Figure 2A:
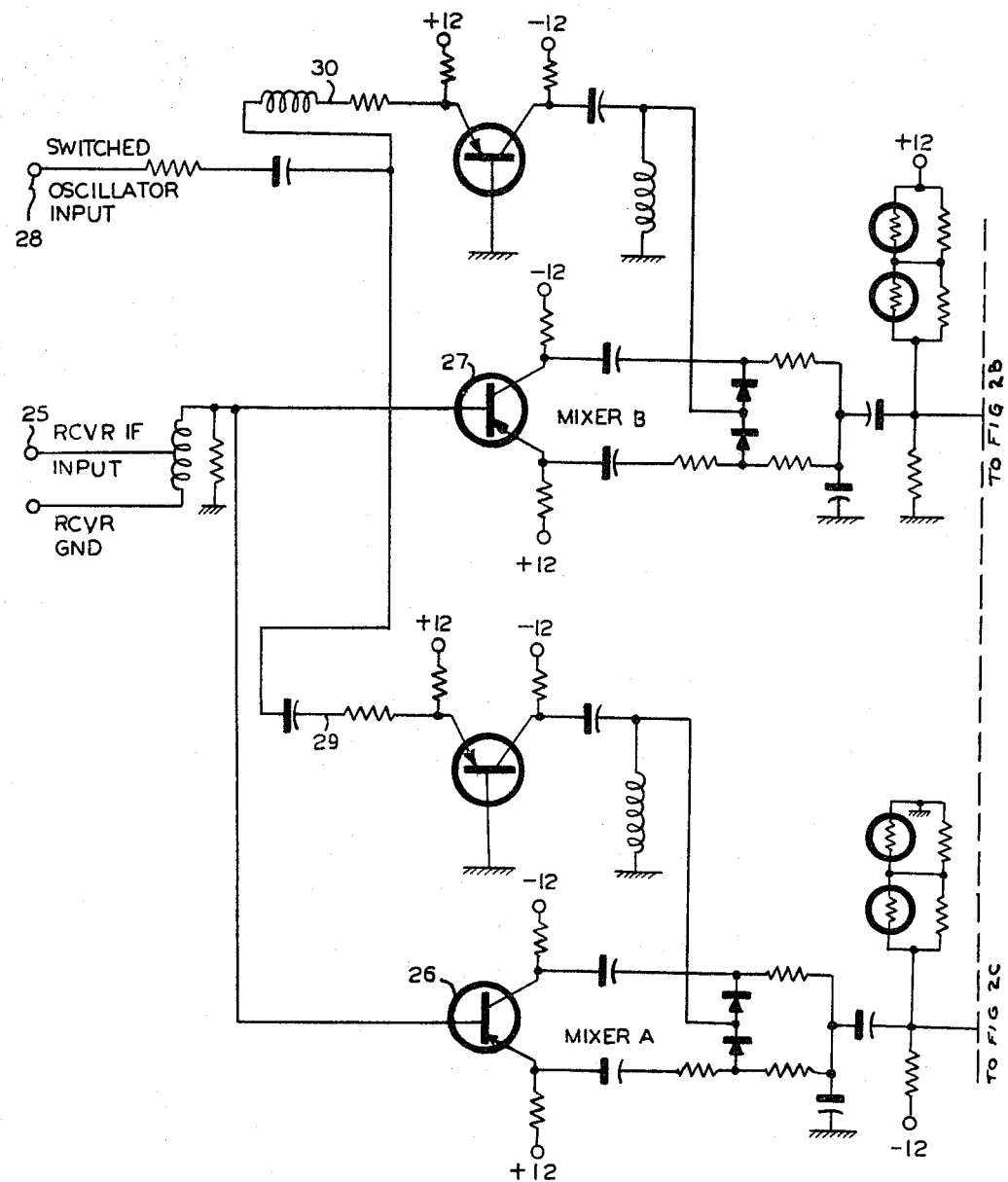

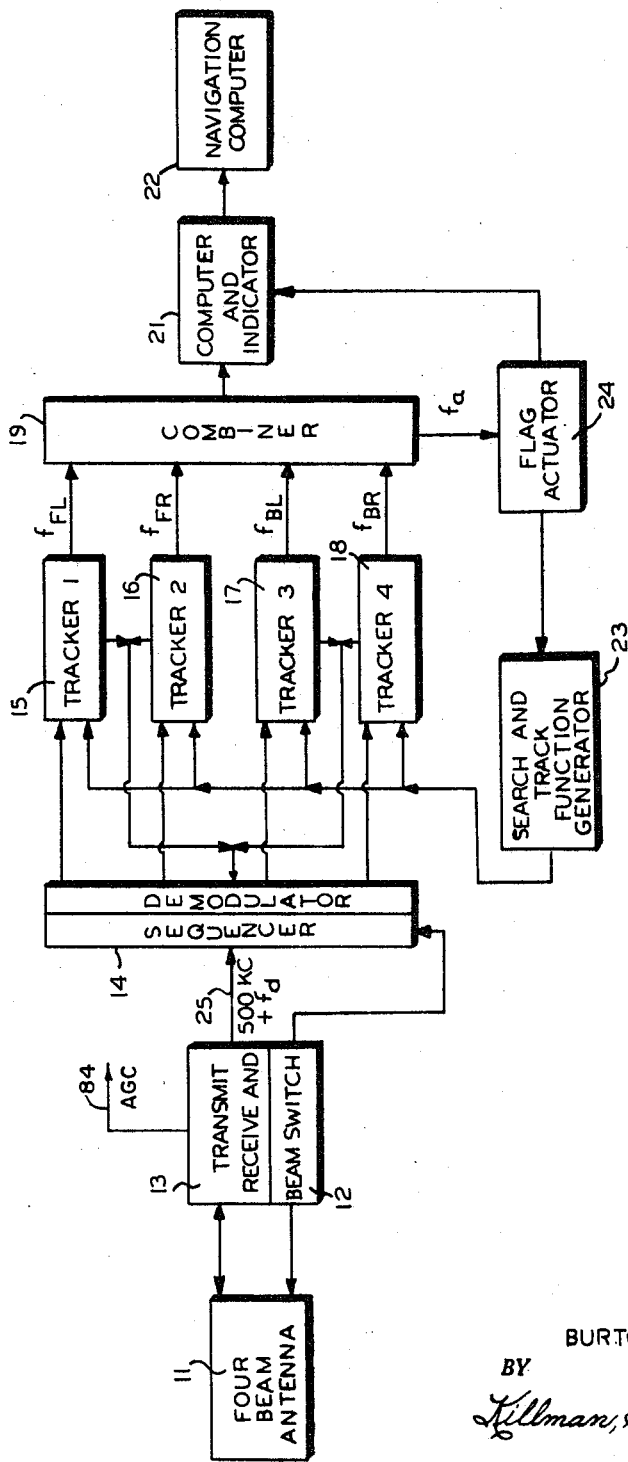

INVENTOR.
BURTON L. CORDRY

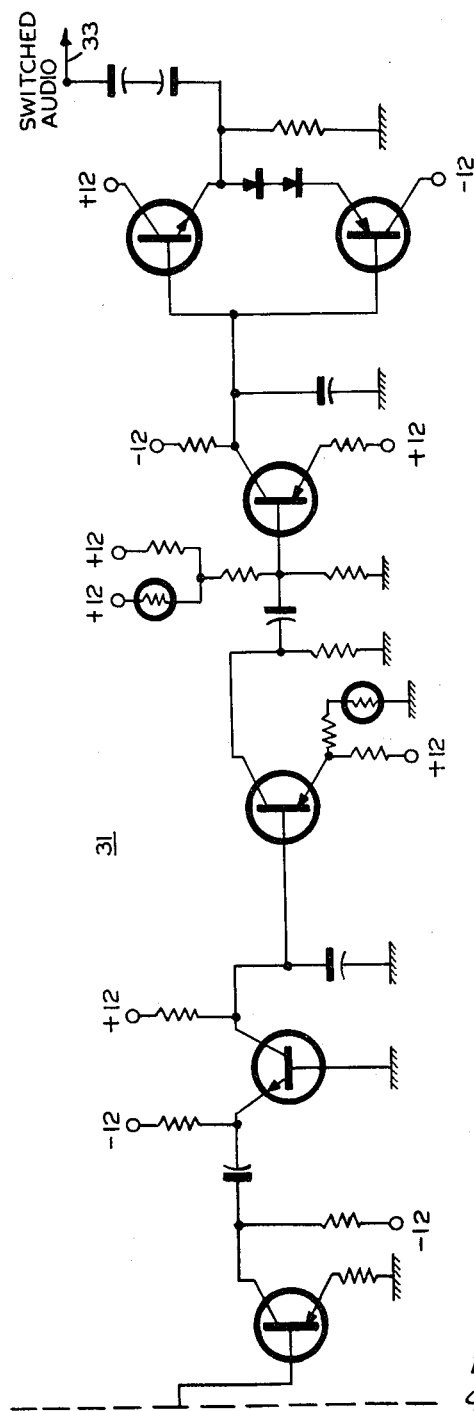

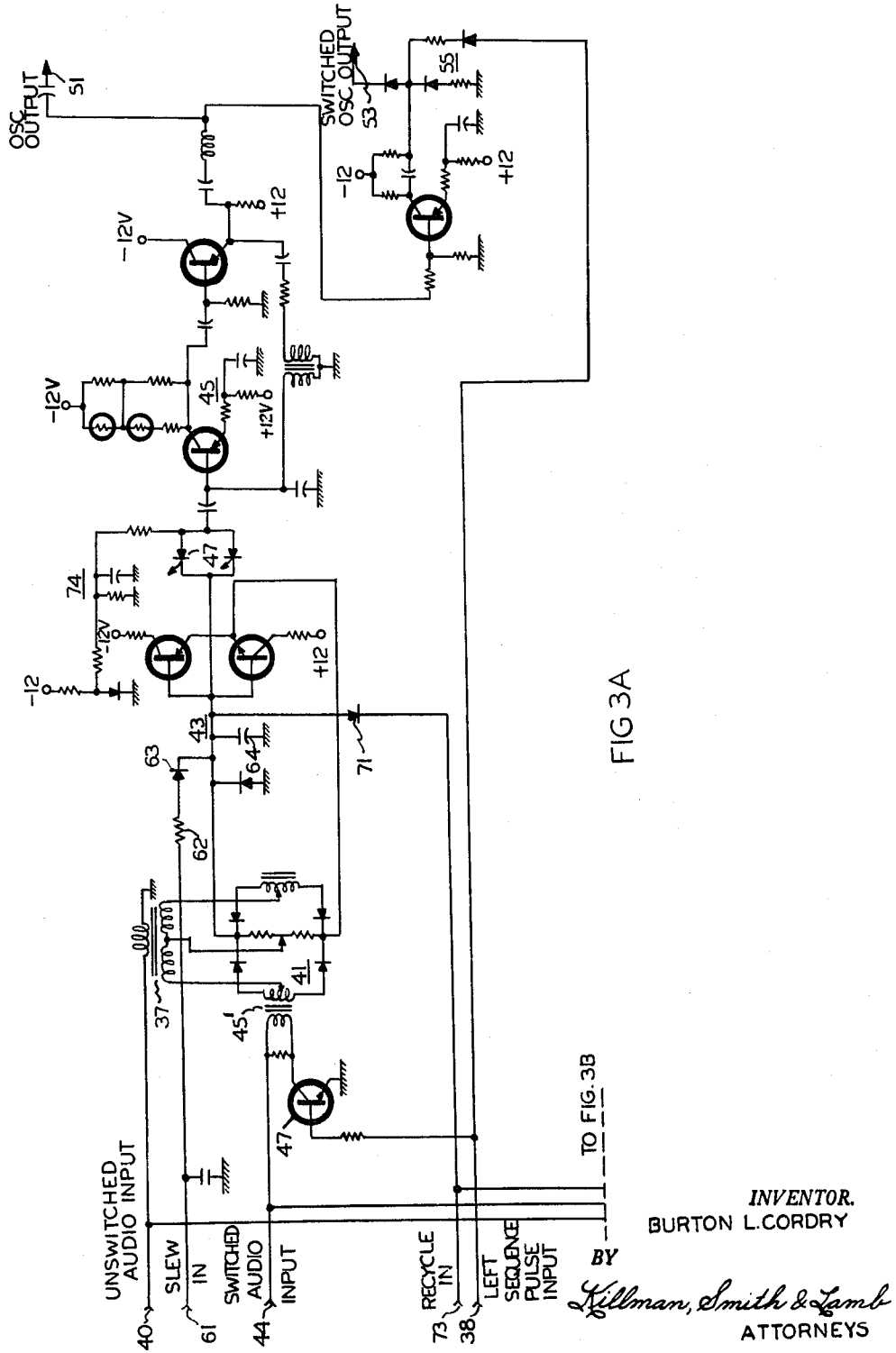

INVENTOR.
BURTON L. CORDRY
BY
Killman, Smith & Lamb
ATTORNEYS

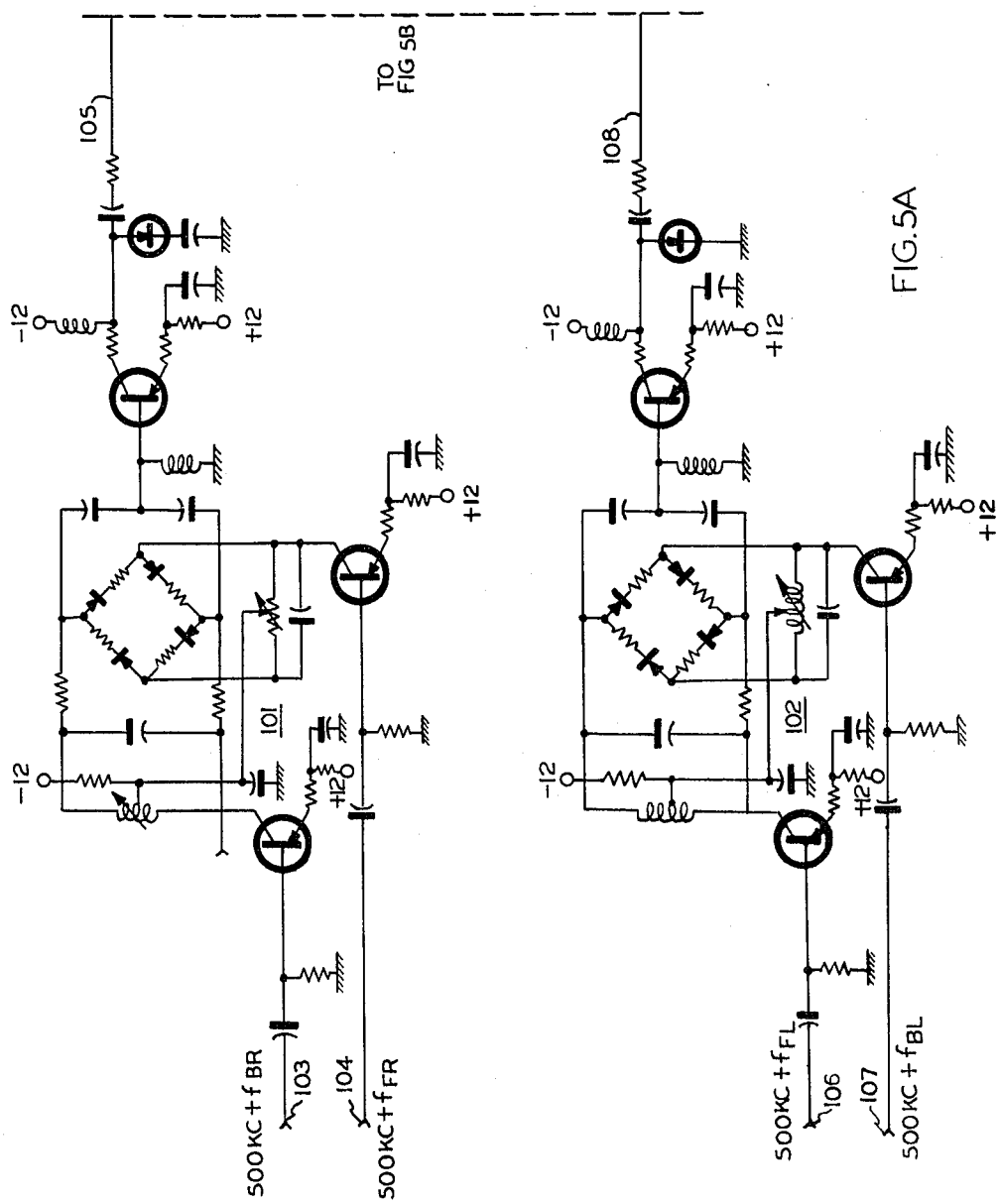

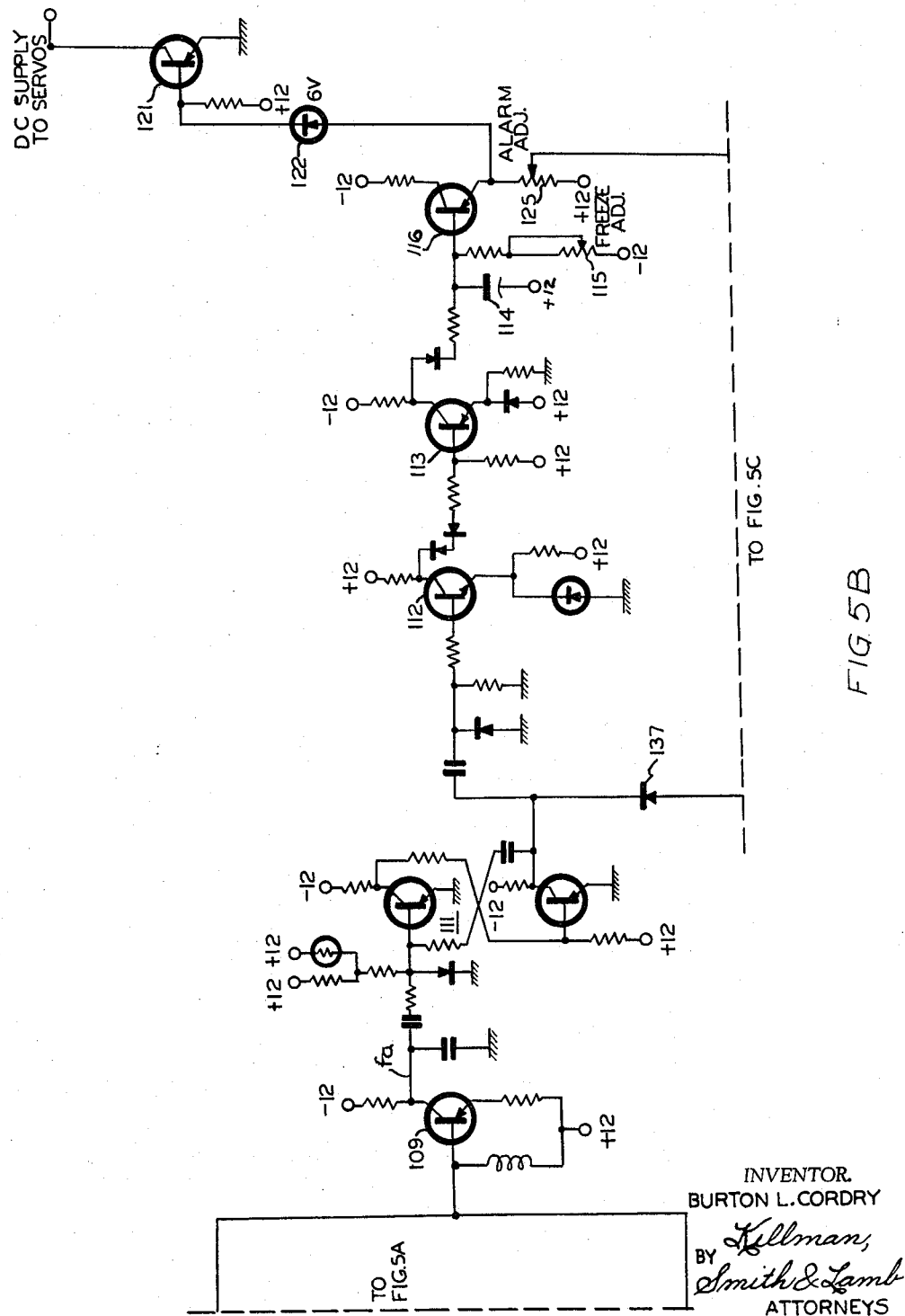

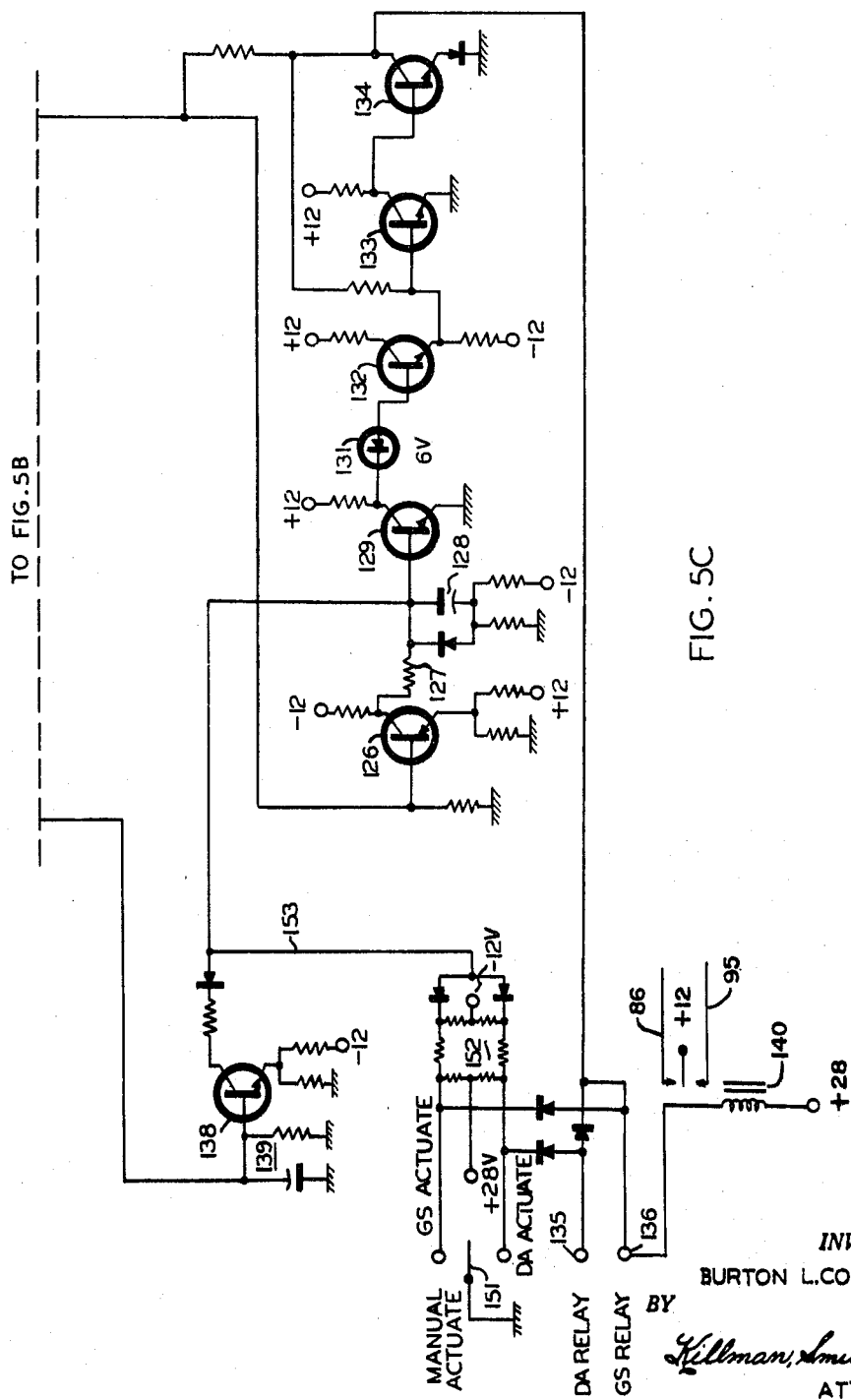

United States Patent Office 3,233,237
Patented Feb. 1, 1966

3,233,237
FREQUENCY LOCK DETECTOR
Burton L. Cordry, Glenarm, Md., assignor to The Bendix Corporation, Towson, Md., a corporation of Delaware
Filed May 24, 1962, Ser. No. 197,306
26 Claims. (Cl. 343—7)

This invention relates generally to Doppler navigation systems and more particularly to improved frequency tracking oscillator circuits and frequency lock detector circuits useful in Doppler systems.

The present invention is disclosed as an improvement in a portion of the system disclosed and claimed in the co-pending application of Gunkel et al., Serial No. 845,034, now U.S. Patent 3,185,981, assigned to the assignee of the present invention. In this co-pending application a Doppler navigation system is disclosed and claimed which utilizes an antenna fixed relative to the aircraft and which produces sequentially four downwardly directed beams positioned symmetrically in the four quadrants defined by the horizontal longitudinal and transverse coordinates of the aircraft. The Doppler data developed from each of the beams is translated into an equivalent Doppler center spectrum frequency generated by four local tracking oscillators operated to provide a distinct frequency corresponding to the center of the spectrum of the Doppler energy returned on each of the beams. This tracker oscillator frequency for each of the four beams is combined by various algebraic manipulations to produce other frequencies which are utilized to derive ground speed and drift angle data and produce indications of these quantities therefrom.

In frequency trackers of the prior art, it has been found that the limiting factor in system sensitivity is the ability to determine whether or not the oscillator is actually tracking a returned Doppler signal. This limitation results from the fact that the trackers utilize correlation and synchronous demodulation techniques and hence are capable of operation with signals that are appreciably below the noise level. In the aforementioned Gunkel et al. application, the method of determining whether the oscillator was tracking a true Doppler signal, i.e. the track-lock detector, comprised means for injecting a 250 c.p.s. frequency modulating signal into the tracking oscillator. The demodulator used to generate the frequency control for the tracking oscillator then produces a 250 c.p.s. component when properly tracking a Doppler spectrum. In actual practice it has been found that the tracking oscillator is capable of producing useful data from signals well below the lower signal level at which the prior art frequency lock detectors provided a reliable indication that the data from the tracking oscillator was good. On the other hand, any attempt to utilize the data from the tracking oscillator at such low levels might result in an actual reliance upon bad data, since the tracking oscillator would continue to produce an output frequency even though the input signal thereto had completely disappeared.

In order to overcome the limitations of prior frequency lock detectors and tracking oscillator systems the present invention utilizes a unique feature of a fixed antenna beam position Doppler system which provides a combination of frequencies that is always substantially zero whenever correct data are being received on all four of the beams of the Doppler system. Since this frequency is always zero if the data on all beams are correct data, the occurrence of an error in the output of any tracking oscillator for any beam, changes this unique frequency combination from zero to some frequency greater than zero by an amount depending upon the error in the data. Thus by detecting when this unique frequency is higher than a predetermined value, say, of 500 cycles, a reliable indication is provided that one or more of the tracking oscillators is not tracking. The present invention utilizes this indication to initiate slewing of the tracking oscillators in order that the correct tracking operation can be reattained while at the same time preserving the last good data by freezing the servos which read out the data to the indicators and navigation instruments.

A further improvement is provided by the present invention by periodically introducing a perturbation in the tracking oscillators of such short duration that the time constants of the tracking circuit do not register the deviation if the oscillator is tracking properly. This is possible since for proper tracking operation the oscillator will return to the correct frequency rapidly after being deviated by the small amount involved in the perturbation. If, however, the oscillator is merely operating with a zero signal input, it will not track back to its original value after being deviated and, hence, will introduce a new frequency into the alarm frequency combination for an extended period of time until the next deviation caused by the periodic perturbations. These deviations are cumulative in the absence of tracking a signal which restores the oscillator frequency. Thus, the system not only provides a sensitive frequency lock detection but also prevents erroneous operation where the data has disappeared after the system has once acquired usable signals. In the absence of this last feature, the system would tend to continue to operate as though receiving usable signals after such signals had disappeared.

It is, accordingly, the object of the present invention to provide an improved Doppler navigation system having improved frequency tracker and track lock detector circuits for achieving the improved results above described.

Another object is to provide an improved frequency tracker which checks tracker operation by periodically introducing perturbations which have a minimum effect on the ground speed and drift angle computations but result in a maximum cumulative effect in detecting erroneous tracking.

Figure 3B:
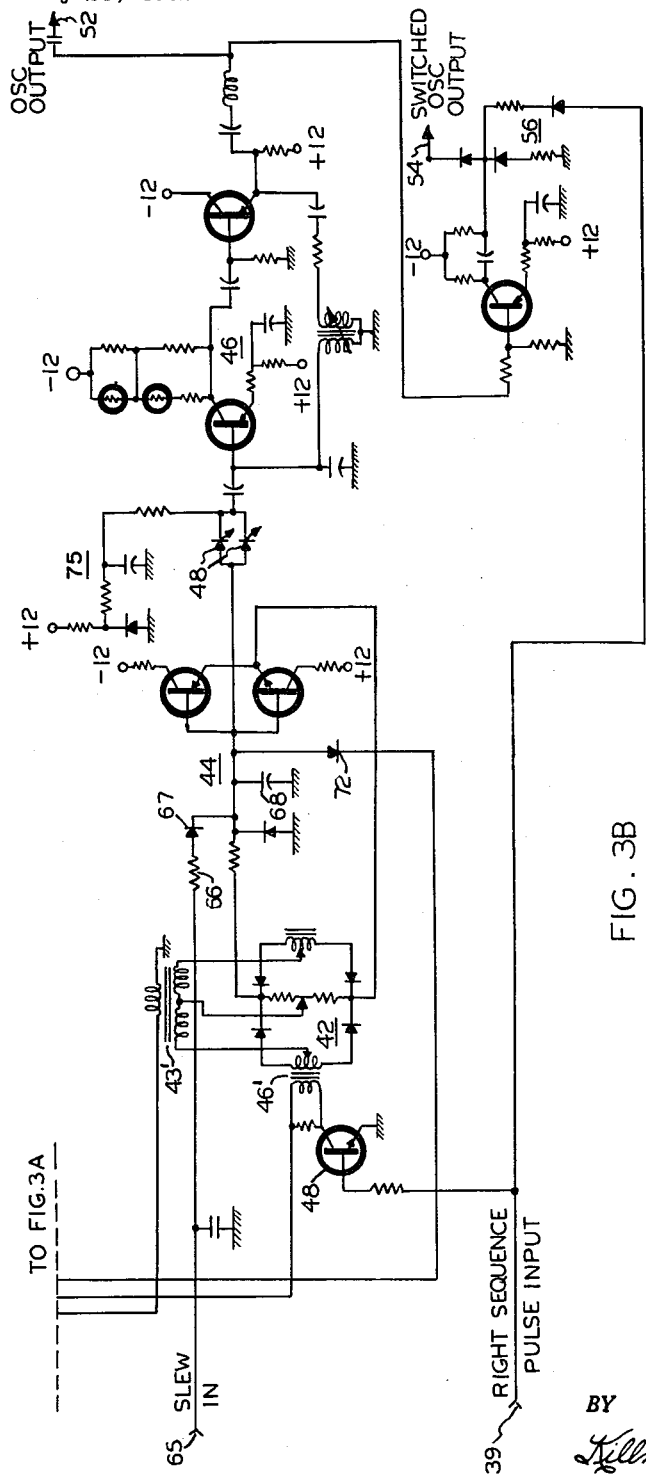
Figure 4A:
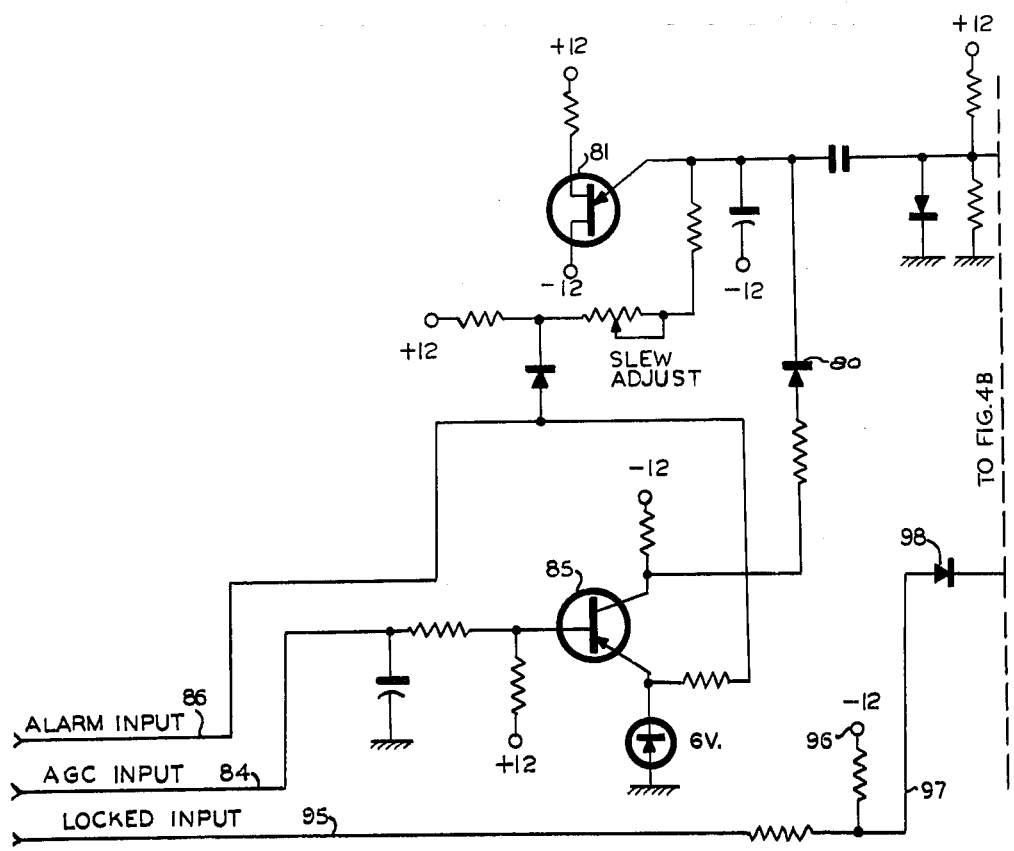
Figure 4B:
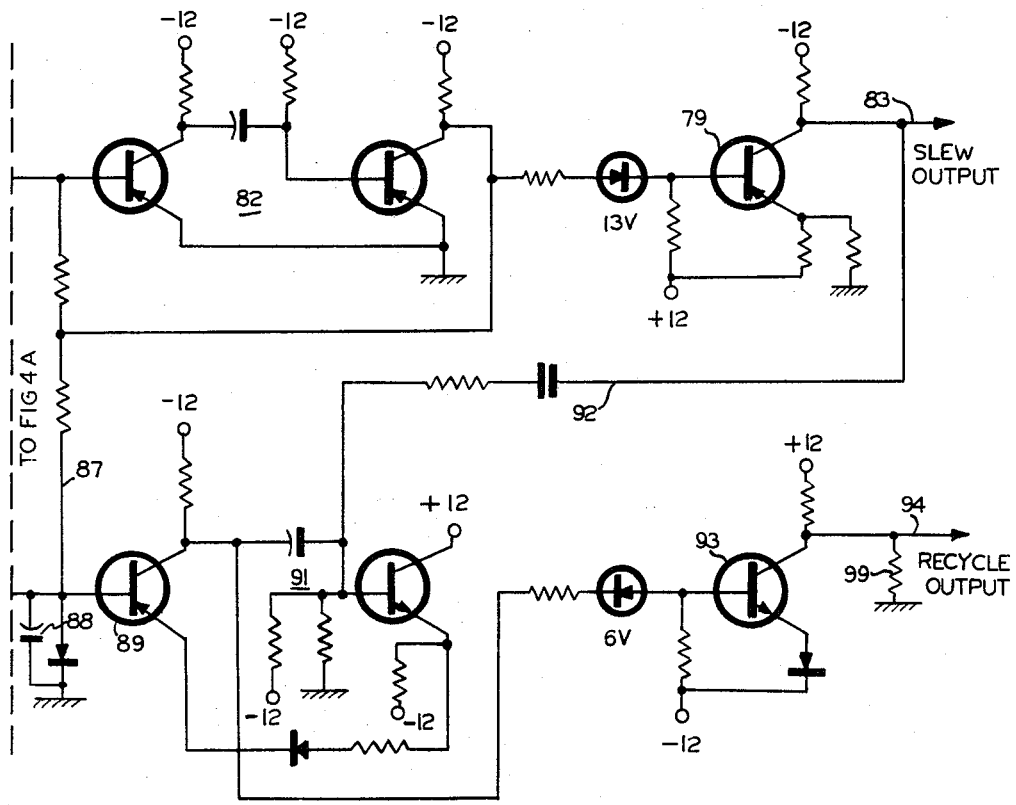

These and other objects of the invention will appear from the following detailed description taken in conjunction with the accompanying drawings wherein:

FIG. 1 is a block diagram of a complete Doppler navigation system;

FIGS. 2A, B, and C taken together are a schematic wiring diagram of a Doppler frequency demodulator for supplying the Doppler spectrum frequencies to all trackers;

FIGS. 3A and 3B taken together are schematic circuits for the right and left tracking oscillators of the system;

FIGS. 4A and 4B taken together are the circuit for the search and track function generator; and FIGS. 5A, B and C together comprise the circuit for the track lock detector and flag alarm circuits.

Referring now to FIG. 1, the general description of the system will be given, reference being made to the aforementioned Gunkel et al. application incorporated herein by reference for a detailed understanding of the system. The system includes a four-beam antenna 11 which is operated to produce sequentially four distinct beam positions relative to the aircraft. For this purpose a beam switch control device 12 is provided in conjunction with the transmit and receive portion of the circuit 13 for carrying on the transmission of microwave energy sequentially over the four beams of the antenna and receiving Doppler shifted signals from the ground. The transmit receive device 13 supplies the Doppler signals $f_d$ on a 500 kc. carrier to the input of a sequencer 14 which is operated in synchronism with the beam switch signals to apply the received Doppler signal on individual beams to four separate trackers 15, 16, 17, and 18. The trackers are supplied input signals in sequence with the rotation of the beam of the antenna to produce a continuous output frequency corresponding to the center of the Doppler spectrum received from each beam position. These four frequencies are designated $f_{FL}$, $f_{FR}$, $f_{BL}$ and $f_{BR}$ and are applied to a combiner 19 where various algebraic combinations of these frequencies are obtained. The combiner 19 supplies signals to a ground speed and drift angle computer 21 which may indicate these quantities and also supply data to a navigation computer 22 for navigating the aircraft.

The trackers 15–18 are operated under the control of a search and track function generator 23 which operates to slew the trackers initially until they lock on a correct Doppler signal and after lock-on, periodically to deviate the frequency of the tracking oscillators to check their operation. The generator 23 is under the control of a flag actuated circuit 24 which operates in response to the frequency $f_a$ which is defined as the difference between the sums of the left beams and the sums of the right beams. As shown in the referenced co-pending application, the sum $f_{FL} - f_{FR} + f_{BL} - f_{BR}$ is equal to zero whenever all of the beam frequencies are correct. The flag actuator circuit 24 also controls the servos in the computer 21 to lock them in their last position whenever the data becomes unusuable in the system. If the data is in error by a predetermined amount and exists for sufficiently long time, a flag indicator is raised to notify the pilot that the system is not operating properly. In the following description, the elements of FIG. 1 shown in detail are the sequencer-demodulator 14, trackers 15 and 16, combiner 19, flag actuator 24, and search and track function generator 23.

Referring now to FIGS. 2A, B, and C assembled as indicated, the Doppler frequency demodulator 14 of the system will be described which corresponds generally with the circuit of FIG. 7a of the Gunkel et al. application. The single sideband Doppler signal from the receiver 13 is applied on line 25 for application through transistors 26 and 27 as one input to balanced mixers A and B. The second input to the mixers A and B is obtained from a switched oscillator input line 28 which applies the output of the tracking oscillators sequentially through the leading and lagging phase shifts circuits 29 and 30 respectively as the other inputs to the mixers A and B.

Figure 2B:
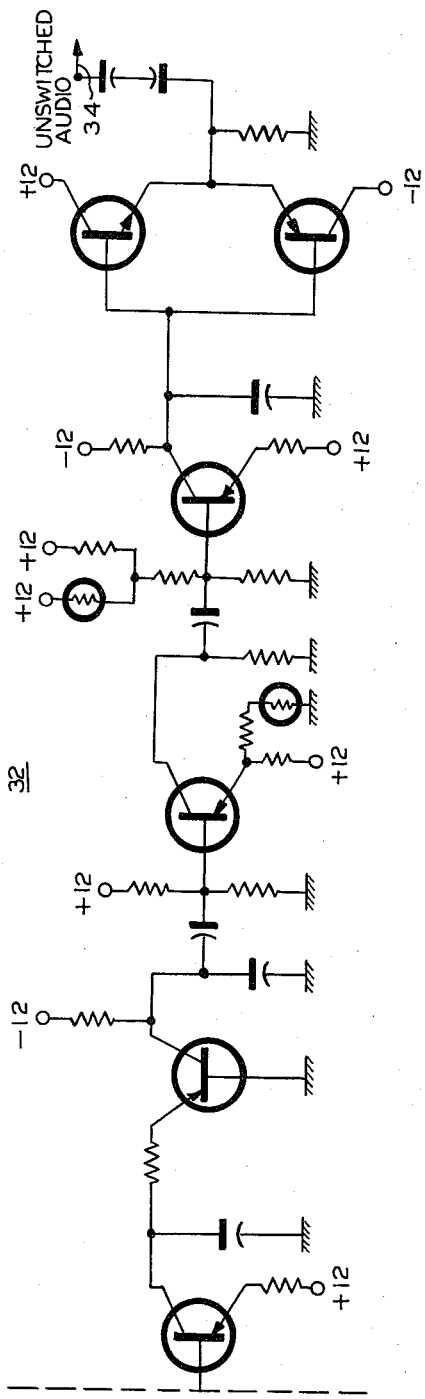

The outputs from the mixers A and B are applied respectively to audio amplifiers generally indicated as 31 and 32, the amplifier 31 of FIG. 2C producing an output at terminal 33 which will provide the switched audio signal to the four audio demodulators hereinafter described. The audio amplifier 32 of FIG. 2B produces at output terminal 34 an unswitched audio output signal for the four audio demodulators.

FIGS. 3A and 3B assembled as indicated show trackers 15 and 16 which include a pair of audio demodulators generally designated 41, 42, integrators 43, 44 and tracking oscillators 45, 46 for a left and a right beam respectively. It will be understood that an identical pair of circuits to those shown in FIGS. 3A and 3B are provided for the remaining left and right beam trackers 17 and 18 of the system. Either set of left and right beams can be used for the forward or rear beams. The unswitched audio input from terminal 34 (FIG. 2B) is applied at terminal 40 to supply the signal to the primary windings of input transformers 37 and 43' of the audio demodulators 41, 42. The audio signal from terminal 33 of FIG. 2C is applied to terminal 44 of FIG. 3A where it is applied to the primary windings of transformers 45' and 46' but only when the corresponding transistors 47 and 48 are conducting under control of the beam sequence pulse inputs applied to terminals 38 and 39. The terminal 38 will receive a beam position sequence pulse for one of the left beams and the terminal 39 will receive a corresponding enabling pulse for one of the right beams. The duplicate pair of circuits corresponding to FIGS. 3A and 3B will likewise be sequenced by the remaining left and right pair of sequence signal pulses.

Since the input transformers 45' and 46' are only energized to correspond with a particular beam position, demodulators 41 and 42 will produce an output only for that particular beam position. The outputs of the demodulators 41 and 42 are applied respectively to the integrator circuits 43, 44 where integration capacitors 64, 68 are charged to provide a control voltage for the voltage controlled oscillators 45 and 46.

The voltage controlled oscillators 45 and 46 are voltage tuned by means of the voltage applied to Varicaps 47 and 48 to control the frequency of oscillators 45 and 46 at a frequency of 500 kc. plus the frequency of the center of the Doppler spectrum of a particular beam. The Varicap voltage is determined by the charge of the integration capacitors 64 or 68 which changes relative to a fixed backbias for each set of Varicaps. Since the Varicaps 47 and 48 are oppositely poled, opposite polarity bias circuits 74 and 75 are provided for back biasing each set of Varicaps.

The outputs of the oscillators 45 and 46 are available continuously from terminals 51 and 52 respectively, from which they are applied to combiner circuits 19. The oscillator outputs are also available at terminals 53 and 54 respectively on a switched basis under the control of the beam switch pulse applied at terminals 38 and 39 for the control of diode switching networks 55 and 56 respectively. The switched oscillator outputs at terminals 53 and 54 and the corresponding switched oscillator outputs from the duplicate left and right trackers corresponding to FIGS. 3A and 3B are connected to the switched oscillator input terminal 28 of FIG. 2A and hence the tracking oscillator frequencies sequentially demodulate the corresponding Doppler spectrum for their respective antenna beams to complete the respective tracker servo loops. These all electronic servo loops operate to maintain the oscillators 45 and 46 (and the corresponding oscillators in the other two trackers) at the frequency corresponding to the center of the spectrum of the respective Doppler single sideband signals applied from the receiver at terminal 25 of FIG. 2A for all of the four-beam positions in sequence.

The operation of this circuit is the same as that described in the referenced Gunkel et al. application except for the elimination of the 400 cycle slewing voltage and the 250 cycle track lock detector signal modulation employed in that co-pending application. The slewing of the oscillators in accordance with the present invention is performed by a D.C. voltage derived from the circuits hereinafter described. This D.C. slewing voltage is applied at terminal 61 of FIG. 3A where it is passed through resistor 62 and diode 63 directly to integration capacitor 64 in the integrator 43. This same signal is supplied in FIG. 3B to terminal 65 where it passes through resistor 66 and diode 67 to integration capacitor 68. By this circuit the application of the same D.C. voltage on terminals 61 and 65 deviates the voltages on capacitors 64 and 68 by the same amount to slew the respective oscillators. The actual frequencies of the oscillators 45 and 46 are deviated in opposite directions due to the reversal of the polarity of the Varicaps 48 with respect to the polarity of the Varicaps 47. Thus the same slewing voltage produces equal and opposite frequency deviations of the right and left oscillators. The frequencies of oscillators 45 and 46 are initially at opposite ends of the tuning range and are slewed in opposite directions over their tuning range. The other pair of tracking oscillators (not shown) for the remaining beam signals are also slewed in opposite directions. There is thus no possibility of the generation of an ambiguous value of $f_a = 0$, which might occur if all four oscillators started at the same frequency and were slewed in the same direction.

The integration capacitors 64 and 68 are discharged at the end of a slewing cycle by means of circuits through diodes 71 and 72 respectively which both connect to a recycle input terminals 73. The recycle voltage applied at terminal 73 and the slew voltage applied at both terminals 61 and 65 are derived from the search and track function generator 23, the circuit of which will be hereinafter described in connection with FIGS. 4A and 4B.

Referring now to FIGS. 4A and 4B the search and track function generator 23 will be described. The slew voltage originates from a double base diode relaxation oscillator 81 which has a normal period of approximately one pulse per second, the output of which is applied to a monstable multivibrator 82 which generates a square voltage pulse of predetermined amplitude and duration for each oscillation of the oscillator 81. The pulses produced by the multivibrator 82 are integrated to produce a linear sweep voltage. This linear sweep voltage is developed in the integration capacitors 64 and 68 of FIGS. 3A and 3B and the corresponding integration capacitors in the other pair of tracking circuits so that the two tracking oscillator frequencies in both pairs of trackers are deviated by uniform increments in opposite directions during slewing. For this purpose the pulses from the multivibrator 82 are connected through an amplifier stage 79 to output terminal 83 which is connected to the slew input terminals 61 and 65 of FIGS. 3A and 3B for application to the integration capacitors 64 and 68 as previously described.

Since for strong signals the slewing rate can be increased without danger of not recognizing a signal and locking on, the oscillation rate of the oscillator 81 is arranged to be increased to approximately 3 pulses per second for receiver AGC potentials above a predetermined level. For this purpose a FAST/SLOW circuit controlled by AGC input 84 is provided which terminates conduction in a transistor 85 at a fixed AGC level to alter the time constant in the circuit of oscillator 81 and thus increase its oscillation rate to 3 pulses per second for strong signals. The AGC potential is derived in the usual manner from the system receiver 13 of FIG. 1. The AGC voltage at terminal 84 varies from +8 volts at noise level signals to zero volts for strong signals. The emitter of the transistor 85 is biased at +6 volts by a zener diode and hence transistor 85 turns on when the AGC voltage is +6 or lower since the base will then be somewhat more negative than the emitter. Turn-on in transistor 85 closes the shunt impedance circuit through diode 80 to increase the charging rate in the time constant circuit of the oscillator diode 81 and hence increase its oscillation rate.

A +12 volt level on an alarm input line 86 enables the FAST/SLOW circuit of transistor 85 to operate in the FAST condition in response to AGC only when the alarm is on (i.e. when the trackers are searching). For this purpose the line 86 is energized by contacts controlled by the relay 140 of FIG. 5C, later to be described.

A recycle circuit is provided to repeat the slewing action in the event that a signal is not acquired in the first pass or to re-institute slewing if a trackable signal has been lost. For this purpose a negative pulse from the multivibrator 82 is applied via line 87 to charge a capacitor 88 which is connected to the base of a transistor 89 in a trigger circuit 91. The trigger circuit 91 is arranged to be triggered by a pulse coupled from the slew output terminal 83 over line 92 whenever the charge on the capacitor 88 reaches negative 6 volts. This level represents the end of the slew excursion and when the trigger circuit 91 is triggered, a signal applied to the base of transistor 93 makes transistor 93 conductive discharging the integration capacitors of FIGS. 3A and 3B. For this purpose a recycle output terminal 94 is connected to the recycle input terminal 73 of FIG. 3A. Once the capacitors 64 and 68 have discharged through the circuits of respective diodes 71 and 72 and the conducting path of transistor 93, the trigger circuit 91 returns transistor 93 to cut-off and the slew cycle is reinstituted. This action also discharges the capacitor 88 due to the conduction in transistor 89 while the trigger circuit 91 is in its regenerative conductive portion of the cycle.

As the capacitor 88 charges to a negative potential during the slew cycle and acquisition of four Doppler signals is achieved, the lock-on condition produces a correct value of $f_a$ which, through the circuits later described with reference to FIG. 5, energizes the alarm relay to lower the alarm flag indication and a +12 volt signal on line 95 is derived from a set of contacts on the energized alarm relay 140. The positive 12 volt signal on line 95 is divided with respect to the negative 12 volt potential applied at terminal 96 to produce a voltage level of −4.3 volts on line 97. This negative 4.3 volts on line 97, in conjunction with the contact potential of diode 98, prevents the capacitor 88 from charging to a more negative level than −5 volts during tracking. Accordingly, when lock-on is achieved, the capacitor 88 remains at the −5 volt level and the trigger circuit 91 cannot be triggered by pulses on line 92. However, as soon as tracking is lost in any beam signal to the extent that $f_a$ exceeds a predetermined value, the alarm relay is deenergized and the positive 12 volt level on line 95 disappears, thereby permitting the capacitor 88 to continue to charge from the negative 5 volt level to negative 6 volts at which point the recycle triggering circuit 91 can occur. Thus, only a one volt change is required on capacitor 88 after the loss of a tracking signal to initiate recycling action in a relatively short interval after the signal is lost.

A resistor 99 is connected between line 94 and ground to divide the positive 12 volt level which supplies the collector of transistor 93 to maintain a positive 3.6 volts on line 94 whenever transistor 93 is not conducting, i.e. at all times other than during the recycling interval. This positive 3.6 volts on line 94 limits the deviation of the integration capacitors 64 and 68 to this level since any tendency to charge to higher voltage will produce conduction in diodes 71 and 72. Thus the upper level of the integration capacitors 64 and 68 is effectively clamped at 3.6 volts which defines the limit of frequency excursion of the tracking oscillators.

When the oscillators 45, 46 are tracking and $f_a$ is essentially zero, the alarm relay opens removing the +12 volts from alarm input line 86. This prevents the fast slew switch from operating for any value of AGC and further slows the slewing pulse rate by effectively removing the shunt from part of the timing resistance in the circuit of 81. This slow sampling rate is then applied on slew output 83 to deviate the voltages on capacitors 64 and 68 an equal amount. However, because of the reversal of polarity of Varicaps 47 and 48, the one tracker will be increased in frequency and the other decreased. If the trackers are receiving usable data the action of the electronic servo loop will return each tracker oscillator to its correct frequency. If the trackers do not return to correct frequency, the error thus introduced into the value of $f_a$ will be of sufficient magnitude after several pulses to produce an alarm indication. By virtue of this periodic perturbation of the tracker oscillator frequencies, the system cannot continue to produce an $f_a$ which appears to be correct when, in fact, proper tracking is not being accomplished. In addition, by perturbing the frequencies for the two left beams in one direction and the frequencies for the two right beams in the opposite direction, any small errors occuring in the averaging of the tracker frequencies tends to be cancelled out by the manner in which these four frequencies are summed and differenced in the computation of ground speed and drift angle. At the same time, this combination of frequency perturbations requires the smallest amount of tracker frequency deviations to produce a given deviation of $f_a$ from zero.

Referring now to FIGS. 5A, B and C assembled as indicated, the flag actuator circuit 24 will be described. In FIG. 5A a ring modulator circuit 101 is arranged to add the single sideband Doppler frequencies from the trackers for the right-hand beams to obtain the sum of these frequencies. Thus the frequency of 500 kc.+$f_{BR}$ is applied to terminal 103 and the frequency of 500 kc.$+f_{FR}$ is applied to terminal 104. The output of the ring modulator 101 on lead 105 is thus 1 mc.$+f_{BR}+f_{FR}$. A second ring modulator 102 is connected to add the tracker frequencies corresponding to the left beams. The frequency 500 kc.$+f_{FL}$ is applied to terminal 106 and the frequency of 500 kc.$+f_{BL}$ is applied to terminal 107 and at lead 108 the frequency of 1 mc.$+f_{FL}+f_{BL}$ appears.

The signals on leads 105 and 108 are both applied to a non-linear mixer transistor 109 where the frequencies of these signals are subtracted to produce an audio frequency signal in the collector circuit of transistor 109 corresponding to the frequency $f_a$ previously defined. The sum components in the collector circuit of the mixer 109 are by-passed to ground.

The frequency $f_a$ from the output of mixer 109 is applied to a monostable hysteresis switch 111 which generates a square wave at the frequency $f_a$. This square wave is differentiated and applied to an NPN pulse shaper transistor 112 and a pulse amplifier 113 to produce a pulse of predetermined amplitude and duration for each cycle of the frequency $f_a$. This pulse is applied to an integration capacitor 114 which is provided with an adjustable time constant circuit by means of variable resistor 115 connected to the negative 12 volt supply. A transistor 116 is normally conducting when $f_a$ is near zero frequency and capacitor 114 has accumulated no charge from pulse amplifier 113. By means of the adjustable resistor 115, the emitter voltage of transistor 116 can be set to be minus 6 volts when the frequency $f_a$ is 500 cycles. If $f_a$ is greater than 500 cycles, the transistor 116 approaches cut-off due to the accumulation of the positive pulses in integrator capacitor 114 and the emitter voltage of transistor 116 becomes more positive than negaitve 6 volts. When $f_a$ is less than 500 cycles, the emitter voltage of transistor 116 is more negative than minus 6 volts and the system is operating normally with good data.

The two conditions of operation of the system are: good data is being received and all servos are operating to supply the output signals and indications required from the system: or bad data is being received. In the latter case (1) if the data is incorrect to the extent that $f_a$ exceeds 500 cycles, the servos will be locked but the alarm will not be given and (2) if the frequency $f_a$ exceeds 1500 cycles and persists for a sufficient time the alarm indication will be given. A delay of 10 seconds is provided as hereinafter described before an alarm indication is given to assure that the large value of $f_a$ is not due to a momentary error but one of substantial duration and hence contributing significantly to error in the output of the system.

The foregoing operating conditions are derived from the emitter circuit of the transistor 116 as follows. The D.C. supply to all of the mechanical servos in the system is through the collector-emitter circuit of a transistor 121. When the transistor 121 is conducting the collector is effectively grounded and a circuit through the servos is energized through this ground connection of the emitter of transistor 121. The transistor 121 is normally biased for conduction through a 6 volt coupling zener diode 122 and the normally conducting emitter-collector path of transistor 116, a small collector resistor and the negative 12 volt supply. For this condition the emitter of transistor 116 is effectively at minus 12 volts. As the positive pulses build up charge on capacitor 114 corresponding to increasing frequencies of $f_a$, the transistor 116 becomes less conductive and its emitter voltage becomes less negative until at —6 volts the isolation diode 122 becomes non-conductive and the positive supply bias to the base of transistor 121 cuts off that transistor. The D.C. supply to the mechanical servos of the system is thereby interrupted, freezing the indicators and computers with their last available good data value.

The alarm circuit is controlled at an adjustable level by means of an adjustable tap on emitter load resistor 125 of the transistor 116 which is set to apply positive 6 volts to the base of a transistor 126 whenever the frequency $f_a$ is 1500 cycles or greater. Prior to the application of +6 volts to the base of transistor 126, it conducts and charges a capacitor 128 to +6 volts from the emitter bias supply of transistor 126. When the base of transistor 126 is positive 6 volts, the transistor is cut-off and connects the negative 12 volt collector supply through the collector resistor and an RC time constant circuit consisting of resistor 127 and capacitor 128 for discharging the capacitor 128. The time constant of resistor 127 and capacitor 128 is 10 seconds so that only if the transistor 126 is cut-off for approximately 10 seconds does the voltage applied to the base of NPN transistor 129 from capacitor 128 drop to ground. When the base of transistor 129 is at ground potential it is cut-off. The transistor 129 is specially selected as a silicon low cut-off current type and the capacitor 128 is of low leakage in order to preserve the extremely long time constant of the combination of resistor 127 and capacitor 128.

If $f_a$ is 1500 cycles or greater for 10 seconds transistor 129 is cut off and this action applies a positive 12 volt potential to a 6 volt zener isolation diode 131 causing it to conduct. This initiates conduction in an NPN transistor 132 which, when conducting, applies a positive collector supply voltage to the base of transistor 133 causing it to conduct, thus grounding the base of transistor 134 and cutting it off. The transistor 134 is normally conducting for the receipt of good data and in this condition its collector-emitter path provides the grounding circuit for the drift angle relay (not shown) connected to terminal 135 and the ground speed relay 140 connected to terminal 136. When conduction in transistor 134 is interrupted by the alarm condition just described, the normally energized drift angle and ground speed relay circuits are opened to interrupt the data circuits to the indicators and to produce an alarm indication as well as the alarm condition to the remainder of the system (such as the potentials on lines 86 and 95).

A fault detector circuit is provided by connecting the output of the hysteresis switch 111 through a coupling diode 137 to the base of an NPN transistor 138. For normal operation $f_a$ is some low frequency but not zero and hence the square wave from the hysteresis switch 111 charges an RC circuit 139 to make the base of transistor 138 approximately —6 volts and the transistor is cut off. If $f_a$ should disappear, however, due to some fault in the system, the output of the switch 111 would be ground potential with the lower transistor of the monostable pair conducting. This D.C. level will produce no output in the A.C. coupled sequence of transistors 112, 113, 116 but it will cut off diode 137. This condition permits the capacitor of RC circuit 139 to discharge and after a short time delay causes the transistor 138 to conduct. Conduction in transistor 138 applies negative voltage from its emitter supply through its collector-emitter path to discharge capacitor 128 and establish the alarm condition.

A manual actuate switch 151 is provided for selectively grounding, through isolation diodes, the drift angle and ground speed relay circuits connected to terminals 135 and 136. This manual operation provides an alternate circuit equivalent to that through transistor 134 for checking out the drift angle and ground speed relay circuits by applying test signals (not shown). A decoupling network 152 is provided for applying a negative voltage on line 153 to initiate the alarm condition by discharging capacitor 128 whenever the manual actuate switch is connected.

The function performed in the operation of the various circuits hereinbefore described which make up the present preferred embodiment of the present invention will now be readily understood by those skilled in the art. Various modifications of the disclosed circuits will be readily apparent to adapt the system to various applications of the invention and it will be understood that the invention may be practiced otherwise than as herein disclosed without departing from the scope of the invention. The invention, accordingly, is limited only by the scope of the appended claims.

What is claimed is:

1. A Doppler navigation system comprising a fixed multibeam antenna, means for deriving a spectrum of Doppler shift frequencies from each beam of said antenna, tunable oscillator means for producing locally generated frequencies, slewing means for varying the tuning of said oscillator means, means for tracking said oscillator means to maintain a fixed relationship between said locally generated frequencies and the center of each of said Doppler frequency spectra, means for combining said locally generated frequencies to produce an alarm frequency which is substantially zero when said locally generated frequencies bear said fixed relationship to the spectra of Doppler frequencies from all of said beams, and means responsive to the value of said alarm frequency for controlling the initiation and termination of said slewing.

2. A Doppler navigation system comprising a fixed multibeam antenna, means for deriving Doppler frequencies from said beams, means for locally generating a frequency for each of said Doppler frequencies, control means operable for slewing each of said locally generated frequencies, tracking means operable to maintain a fixed relationship between each said locally generated frequency and a respective one of said Doppler frequencies, means for combining said locally generated frequencies to produce an alarm frequency which is substantially zero when said fixed relationship is being maintained between the Doppler frequencies received on all of said beams and all of said locally generated frequencies, and means responsive to values of said alarm frequency greater than a predetermined frequency for operating said control means to slew said locally generated frequencies and terminate said slewing for values of said alarm frequency less than said predetermined frequency.

3. A system according to claim 2 in which said antenna is mounted on an aircraft and produces four beams symmetrically directed downawrdly into the four quadrants defined by the longitudinal and transverse axes of said aircraft, and said alarm frequency is generated by means for combining all of said locally generated frequencies to obtain the difference between the sum of the beams to the left of said longitudinal axis and the sum of the beams to the right of said longitudinal axis.

4. A Doppler navigation system for a vehicle comprising means for deriving Doppler frequencies from each of four beams symmetrically positioned relative to the longitudinal and transverse coordinates of said vehicles, said beams being located in the front-left, front-right, back-right and back-left quadrants defined by said coordinates, means for obtaining a first quantity representing the sum of the Doppler frequencies of the beams in said front-left and back-left quadrants, means for obtaining a second quantity representing the sum of the Doppler frequencies of the beams in said front-right and back-right quadrants, means for obtaining the difference between said first and second quantities, means for altering the terms summed to produce said first and second quantities, and means responsive to the value of said difference exceeding a predetermined value for controlling said means for altering the terms summed to produce said first and second quantities to alter said terms in a manner to reduce said difference to less than said predetermined value.

5. A Doppler navigation system for an aircraft comprising means for radiating energy in two left beams and two right beams downwardly from said aircraft with one beam in each of the four quadrants defined by the longitudinal and transverse axes of said aircraft, means for receiving reflected energy to derive Doppler frequency shift signals from each of said beams, oscillator means for generating a frequency repreesnting the Doppler signal from each of said beams, automatic frequency tracking means for said oscillator means responsive to the generated frequencies of said oscillator means and said Doppler signals to vary said generated frequencies in accordance with variations in said Doppler signals respectively, means for combining said generated frequencies to obtain a quantity representing the difference between the sum of frequencies from said left beams and the sum of frequencies from said right beams, and means responsive to said difference exceeding a predetermined value for deviating said generated frequencies over a range corresponding to range of normal Doppler frequency shift encountered by said aircraft.

6. Apparatus according to claim 5 and including means for periodically deviating said oscillator means in frequency by a small increment, said frequency tracking means returning said generated frequencies to the value representing said Doppler signals when said Doppler signal is adequate for tracking, and time delay means for delaying the response of said means responsive to said difference until said difference has persisted for the period of said time delay.

7. A frequency lock detector for a Doppler system comprising means for radiating and receiving microwave energy on a plurality of spaced antenna beams, means for obtaining Doppler frequency shift signals from each of said beams, oscillator means tunable over a range equivalent to the range of said Doppler frequency shift for producing a plurality of locally generated frequencies bearing a fixed relationship respectively to the frequencies of said signals, means for combining said locally generated frequencies to produce an alarm frequency which is substantially zero when all of said locally generated frequencies bear said fixed relationship to said signals, means operable for tuning said oscillator means over said range, and means for alternately operating and terminating said tuning in response to the frequency of said alarm frequency relative to a predetermined frequency.

8. Apparatus according to claim 7 and including automatic frequency control means for maintaining individual ones of said locally generated frequencies at the frequency bearing said fixed relationship to a respective one of said signals after said tuning brings said locally generated frequencies into a region approaching said fixed relationship to said signals, said frequency control means including mixing means for combining the output of said oscillator means with said Doppler frequency shift signals and means for demodulating the output of said mixing means to produce a frequency control signal.

9. Apparatus according to claim 8 in which said means operable for tuning said oscillator means periodically changes said locally generated frequencies by a frequency increment to deviate said frequencies from said fixed relationship and said automatic frequency control means operates in the interval between said increments to restore said fixed relationship between said locally generated frequencies and said signals when said locally generated frequencies are in said region.

10. Apparatus according to claim 7 in which said means responsive to said alarm frequency includes means for recycling the tuning of said oscillator means over said range when said alarm frequency is above said predetermined frequency.

11. A Doppler navigation system for an aircraft comprising an antenna for radiating and receiving energy in four beam positions located symmetrically beneath said aircraft in the four quadrants defined by the longitudinal and transverse axes of said aircraft, means for deriving Doppler frequency shift signals from each of said beams, four tunable oscillators, synchronous demodulator means responsive to four pairs of inputs each pair consisting of the frequency of one of said oscillators and one of said Doppler frequency shift signals for generating four error signals representative respectively of the frequency difference between said inputs, said error signals being generated only when the respective one of said Doppler frequency shift signals is present and the corresponding said frequency difference is less than a predetermined amount which is small in comparison to the range of normal Doppler frequency shift encountered by said aircraft, means for applying said error signals to tune said oscillators respectively to frequencies related to said Doppler frequency shift signals, means for adding the frequencies from two of said oscillators to obtain a first sum frequency equal to the sum of said Doppler shift frequencies of said beams in the two quadrants to the left of said longitudinal axis, means for adding the frequencies from the remaining two of said oscillators to obtain a second sum frequency equal to the sum of said Doppler shift frequencies of said beams in the two quadrants to the right of said longitudinal axis, means for obtaining an alarm frequency equal to the difference between said first and second sum frequencies, means for periodically applying a tuning increment for tuning all of said oscillators by equal periodic frequency increments over said range corresponding to said normal Doppler frequency shift, each said error signal when present restoring during the interval between said increments the frequency of said oscillators to a value related to its respective Doppler frequency shift signal, recycling means for returning the tuning of said oscillators to a frequency at an end of said range after said increments have tuned at least some of said oscillators across said range, and means responsive to said alarm frequency being below a predetermined frequency for disabling said recycling means.

12. A system according to claim 11 wherein said means for deriving Doppler frequency shift signals includes a receiver having means for developing an AGC potential in accordance with received signal strength, and with additional means for increasing the rate of said periodic increments in response to AGC potentials representing received signal strength greater than a predetermined level.

13. Apparatus according to claim 12 and including means responsive to said alarm frequency being below a predetermined frequency for disabling said means for increasing the rate of said periodic increments.

14. Apparatus according to claim 11 in which said oscillators are voltage tunable oscillators and including means for generating periodic pulses to supply tuning increments.

15. Apparatus according to claim 11 in which said means responsive to said alarm frequency is responsive at a first lower and a second higher predetermined frequencies, said disabling of said recycling means occurring for said alarm frequency below said second higher frequency, means responsive to said alarm frequency being higher than said first lower frequency for interrupting utilization of currently acquired data by said navigation system and means responsive to said alarm frequency being higher than said second higher frequency for producing an alarm indication.

16. Apparatus according to claim 15 and including time delay means operative to delay removal of said alarm indication until said alarm frequency has been lower than said second higher frequency for a substantial interval of time.

17. Apparatus according to claim 16 in which the frequencies of said tunable oscillators for said two left beams are deviated by a frequency increment in one direction and the frequencies of said tunable oscillators for said two right beams are deviated by a corresponding frequency increment in the opposite direction.

18. A four beam Doppler navigation system comprising fixed antenna means for radiating and receiving energy beams symmetrically in the quadrants beneath a vehicle defined by the longitudinal and transverse axes of the vehicle and for receiving returns from said beams modified by Doppler frequency shifts, oscillator means tunable over a range of frequencies equivalent to the range of Doppler frequency shifts received on each of said beams for all conditions of use, means for initially establishing the frequency of said oscillator means for the two beams to the left of said longitudinal axis at one end of said tuning range and the frequency for the two beams to the right of said longitudinal axis at the other end of said tuning range, means for tuning said oscillator means to vary the frequencies for said left beams in one direction and to vary the frequencies for the right beams in the other direction over said tuning range, and tracking means for maintaining a fixed relationship between the frequency of said oscillator means and the received Doppler frequency shift for each of said beams after said oscillator means is tuned to a frequency bearing said fixed relationship.

19. Apparatus according to claim 18 and including means for obtaining the difference between the sum of the frequencies for said left beams and the sum of the frequencies for said right beams, and means responsive to the frequency of said difference relative to a predetermined frequency for interrupting or initiating said tuning of said oscillator means over said tuning range.

20. A four beam Doppler navigation system comprising fixed antenna means for radiating and receiving energy beams symmetrically in the quadrants beneath a vehicle defined by the longitudinal and transverse axes of the vehicle, oscillator means tunable over a range of frequencies corresponding to the Doppler frequency shift received on each of said beams, means for initially establishing the frequency of said oscillator means for the two beams to the left of said longitudinal axis at one end of said tuning range and the frequency for the two beams to the right of said longitudinal axis at the other end of said tuning range, and means for applying periodic tuning increments to said oscillator means for changing the initially established frequencies for said right and left beams in opposite directions.

21. Apparatus according to claim 20 and including automatic frequency control means operable during the interval between said tuning increments for returning the frequencies of said oscillator means to frequencies bearing a fixed relationship to the respective Doppler shifts on said beams whenever said frequencies approximately bear said fixed relationship to said Doppler shifts.

22. A four beam Doppler navigation system comprising fixed antenna means for radiating and receiving energy beams symmetrically in the quadrants beneath a vehicle defined by the longitudinal and transverse axes of the vehicle, oscillator means tunable over a range of frequencies corresponding to the Doppler frequency shift received on each of said beams, automatic frequency control means for tuning the frequencies of said oscillator means to bear a fixed relationship to the respective Doppler frequency shift of said beams, and means for periodically applying a tuning increment to said oscillator means to deviate said frequencies, said deviation being eliminated by the operation of said automatic frequency control means when said respective Doppler frequency shifts are being detected.

23. Apparatus according to claim 22 in which said tuning increments deviate the frequencies corresponding to beams in the quadrants to the left of said longitudinal axis in a direction opposite the deviation applied to frequencies corresponding to beams in the quadrants to the right of said longitudinal axis.

24. Apparatus according to claim 23 and including means for obtaining the difference between the sum of the frequencies for said beams in said left quadrants and the sum of the frequencies for said beams in the right quadrants, and means responsive to said difference exceeding a predetermined value for a predetermined time interval for tuning said oscillator means to an initial condition having the frequencies for said left quadrants at one end of said range and frequencies for said right quadrants at the other end of said range, the ends of said range to which said frequencies are tuned being that from which said tuning increments will deviate the frequencies for the right and left quadrants across said range.

25. Apparatus according to claim 24 and including further means responsive to said difference exceeding a predetermined value for a predetermined time interval for increasing the rate of application of the periodic tuning increments.

26. Apparatus according to claim 25 and including means responsive to an AGC signal from said system for disabling said means for increasing the rate of application of the periodic tuning increments whenever the level of the AGC signal indicates the reception of weak signals from said energy beams.

References Cited by the Examiner
UNITED STATES PATENTS

| | | | |
|---|---|---|---|
| 2,881,321 | 4/1959 | Dauksher et al. | 343—7.7 |
| 3,082,417 | 3/1963 | Meyer | 343—9 |
| 3,095,563 | 6/1963 | Vladimir | 343—8 |

LEWIS H. MYERS, *Primary Examiner.*

CHESTER L. JUSTUS, *Examiner.*